June 5, 1956  H. J. ELLISON  2,749,307
DEIONIZING DEVICE
Filed April 23, 1954

INVENTOR:
HAL J. ELLISON
BY
ATT'YS

United States Patent Office 2,749,307
Patented June 5, 1956

2,749,307

DEIONIZING DEVICE

Hal J. Ellison, Chicago, Ill.

Application April 23, 1954, Serial No. 425,118

2 Claims. (Cl. 210—24)

This invention relates to a unit for treating water or aqueous solutions to remove undesirable ions. More particularly, the invention relates to a device for preparing relatively small quantities of water from which ions have been removed, for various uses, importantly, for washing purposes where it is desired to deionize or soften the water.

Prior to the present invention, several devices have been proposed for treating small quantities of water by means of ion exchange substances. These devices suffer from certain disadvantages, such as being cumbersome, bulky, time-consuming and relatively expensive.

It is, therefore, an object of the invention to provide a water treatment unit which overcomes the disadvantages of the prior constructions.

An important object is to provide a simple, compact portable, inexpensive and disposable water treatment or deionizing unit which produces water of the desired quality and which is especially handy as an item of lavatory, kitchen, camping, and photographic equipment and the like.

A further object is to provide a reliable and effective water treatment unit furnishing a considerable volume of deionized water and which indicates exhaustion of an ion exchange substance included in the unit.

An additional object is to provide a unit which utilizes nearly all of the available capacity of the ion exchange substance included.

Figure 1:
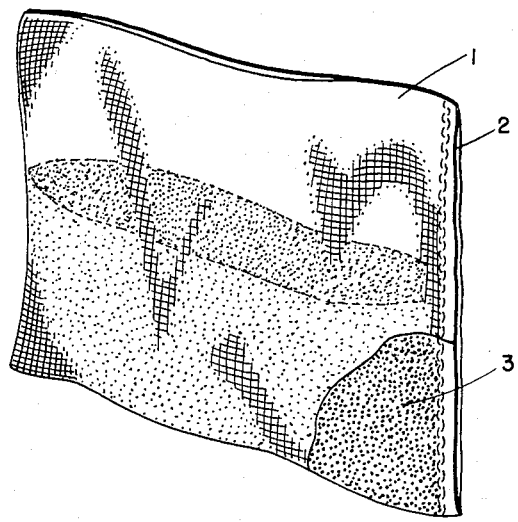
Figure 2:
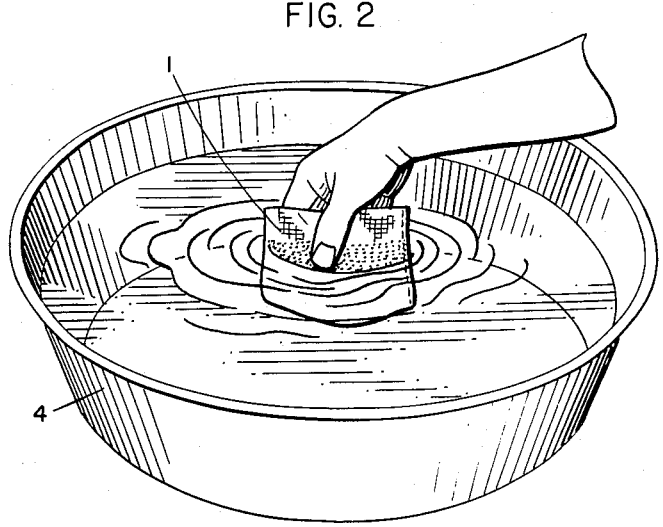

These and other objects, advantages and functions of the invention will be apparent on consideration of the following description and the accompanying drawing illustrating a preferred embodiment of the invention, in which like parts are identified by like reference characters in each of the views, and in which Figure 1 is a perspective view of a water treatment unit embodying the invention, broken away to reveal the interior; and Figure 2 is an illustration of the use of the unit in treating water.

In accordance with the invention, a water treatment unit or device is provided which may consist essentially of a porous container and a quantity of an ion exchange substance within the container. The device preferably consists of a porous container, a quantity of an ion exchange substance within the container, and a dye on the ion exchange substance which provides a colorimetric indication of the exhaustion of the substance.

The unit is very advantageously a foraminous, pervious or screen-like water-resistant bag, envelope or pouch, and a quantity of a cation exchange substance and a quantity of an anion exchange substance within the bag, at least one of the exchange substances being provided with an indicator dye. The unit is preferably a compact hand-sized package for manual movement in a small vessel of liquid, agitating the liquid and effecting good contact with the bag, the unit being cupped in the hand or supported at one edge by the user's hand to quickly and effortlessly deionize tap water in a wash bowl or dishpan, for example.

Referring to the drawings, the embodiment of the new water treatment unit or assembly 1 illustrated includes a flexible, light-transmitting foraminous bag 2 constructed of relatively loosely woven water-resistant synthetic fiber which transmits light. Contained in the bag 2 is a resin mixture 3 consisting of a cation exchange resin and an anion exchange resin, one of which is dyed with an acid-base indicator. In the construction shown, the bag is sewn along each edge, completely enclosing and containing the resin mixture. The bag may also be left open at one edge if desired or provided with a handle or other refinements.

The deionizing unit 1 is quite small, measuring about 3 inches x 4 inches and containing about 100 to 300 or 400 ml. of resin mixture, so that it may be supported by the hand without effort and moved back and forth in a pan or bowl of water 4, as illustrated in Figure 2. The bag 2 is sufficiently porous to allow water to enter freely yet woven sufficiently tightly to retain within it the resin mixture, which is ordinarily in the form of the small beads of commerce. The bag is flexible and filled incompletely, to permit free flow and circulation of water through the resin and loosely restricted movement of the resin in the bag.

The foraminous or perforate bag is sturdy, being relatively wear and abrasion resistant, and is relatively water-resistant, i. e., not swelling, shrinking, weakening or reacting appreciably with water. The bag preferably transmits light so that the color of the resin and particularly that of the dye thereon readily can be ascertained at any time, to determine the degree of exhaustion of the resin.

The bag is preferably constructed of a water-resistant synthetic fiber which is relatively loosely woven to provide a fabric which is permeable by water and permits rapid access to the exchange substance in the bag for correspondingly rapid deionization. Various fibers are known to be suitable for the intended purpose. To mention a few, polymers such as Saran, a vinylidene chloride-vinyl chloride copolymer; nylon, a polymer of hexamethylenediamine and adipic acid; Dacron, a polyester; and Orlon, an acrylic-type fiber, particularly acrylonitrile homopolymer, may be used. Preferably, a Saran fiber is employed, the ratio of vinylidene chloride to vinyl chloride being about 90–10 to 85–15. The commercially available product has the ratio 90–10, a softening point of 120–140° C. and a molecular weight of the order of 20,000.

The ion exchange substance is preferably a mixture of a cation exchange resin and an anion exchange resin, to remove both types of ions. Various of the well-known exchange substances may be employed in the unit depending upon the quality of the water desired, the composition of the water to be treated, the ions which are to be removed and similar considerations. It is desirable that the resins selected do not throw color into the deionized water. Suitable resins are, for example, Nalcite HCR and MCR cation exchange resins and Nalcite WBR, SAR and SBR anion exchange resins. The cation exchange resins are sulfonated polystyrene-divinylbenzene copolymers which can be prepared, for example, as described in U. S. Patent 2,366,007. The anion exchange resins are styrene-divinylbenzene copolymers containing halomethyl groups reacted with amines, preferably tertiary amines such as trimethylamine or dimethylethanolamine. The use of these resins for making de-ionized water is well known per se.

The most advantageous proportions of anion to cation exchanger may be readily determined by well-known methods. For example, the ratio can be computed from known theoretical capacities of given resins, or it can be established by experimental combinations. Various factors may be determinative of the anion exchanger-cation exchanger ratio to be employed. A predominance of certain difficultly removable ions may make an excess of anion or cation exchanger desirable. The deionizing unit containing about 150 ml. of resin mixture, for example, will provide a number of gallons of good quality water which can be used for most purposes requiring distilled water. Depending on the use and results desired, from about 15 gallons to 100 or more gallons of water may be treated.

It will be understood that to be capable of producing completely deionized water, it is necessary to have the cation exchanger in the hydrogen form and the anion exchanger in the hydroxide or free base form. The ion exchange substances may be treated by any of several well-known methods so as to place the exchanger portion of the resins in the proper ionic form.

For various applications, it is unnecessary to provide both cation and anion exchangers, nor need they be in the hydrogen and hydroxide forms necessarily. For softening water intended for washing dishes or clothes, for example, the provision of a cation exchange substance in the salt form, such as the sodium form, is sufficient. Of course, for certain uses, the production of an acidic or alkaline solution is undesirable, and the resins must be constituted accordingly.

To provide the previously referred to indication of exhaustion, one or both of the ion exchange resins is very advantageously provided with a dye, which is an acid-base indicator in the preferred unit. For this purpose, the resin used is desirably light in color. The indicator can be dispensed with, approximate control being possible by noting the amount of water treated and discontinuing use on reaching a predetermined total. However, this procedure is manifestly inferior to the use of an indicator.

When only one resin is dyed, it is preferable to have that resin in such proportion to the undyed resin that the dyed resin is the first to become exhausted. This insures that the indicator dye will give a sufficient warning to the operator that the resin is no longer capable of producing deionized water.

In the preferred form of the water treating or deionizing assembly, a bag about the size of the hand is provided, so that the user is able to place it in a small vessel of water and quickly soften the water. The unit may be used a considerable number of times, until the resin is substantially exhausted, as evident from the color change. The device, being very economical, may then be discarded. If desired, the resin can be regenerated in known manner.

A number of gallons of high quality water can be prepared, satisfactory for various purposes requiring distilled water.

The unit is advantageous and versatile in its application to numerous uses requiring a lesser degree of ion removal. For instance, it finds important application in treating water intended for washing the face and hair, for better cleansing without irritation of the skin, complete removal of soap and avoidance of residues. It can be included in traveling or camping equipment, for treating the many different types of water encountered before cooking or washing. Photographic solutions are prepared from water first contacted with the unit. Where lesser ion removal is satisfactory, the useful life of the unit is surprisingly long, rendering the cost of each use insignificant.

The invention thus provides a number of important advantages. The device can be operated effectively by anyone, and its cost renders it attractive and available to the average individual.

The invention is hereby claimed as follows:

1. A water treating device consisting of a relatively flat, flexible, light-transmitting, foraminous, hand-sized bag constructed of a water resistant synthetic fiber which transmits light and which is relatively loosely woven to provide a fabric that is permeable by water, non-swelling, and non-shrinking, said bag containing mobile discrete solid particles of a resin mixture consisting of a cation exchange resin and an anion exchange resin, said particles being sufficiently large to be retained by the perforations in said bag, and at least one of said ion exchange substances containing a dye which provides a colorimetric observation of the exhaustion of at least one of said ion exchange substances and is visible through the walls of said bag.

2. A water treating device as claimed in claim 1 in which said foraminous bag is made of woven fibrous vinylidene chloride-vinyl chloride copolymer.

References Cited in the file of this patent

UNITED STATES PATENTS

| | | |
|---|---|---|
| 1,504,329 | Edelstein | Aug. 12, 1924 |
| 2,072,976 | Andrus | Mar. 9, 1937 |
| 2,087,157 | Lind | July 13, 1937 |
| 2,117,091 | Gudmondsen | May 10, 1938 |
| 2,335,657 | Eweson | Nov. 30, 1943 |
| 2,586,770 | Alm | Feb. 26, 1952 |
| 2,586,882 | Stroh | Feb. 26, 1952 |

FOREIGN PATENTS

| | | |
|---|---|---|
| 295,004 | Great Britain | Dec. 20, 1928 |
| 493,539 | Great Britain | Jan. 6, 1937 |

OTHER REFERENCES

Rohm and Haas Co. Bulletin, "Self-indicating Amberlite For Monobed Deionization," May 1950, 4 pages.

Modern Plastics, vol. 28, No. 1, September 1950, pages 79 and 80.